March 23, 1965     H. P. LOUDEN     3,174,249

FISHING LINE ACCESSORY

Filed Jan. 16, 1964

INVENTOR.
HERMAN P. LOUDEN
BY Hamilton & Cook
ATTORNEYS

United States Patent Office 3,174,249
Patented Mar. 23, 1965

3,174,249
FISHING LINE ACCESSORY
Herman P. Louden, 348 N. Chestnut St., Ravenna, Ohio
Filed Jan. 16, 1964, Ser. No. 338,092
7 Claims. (Cl. 43—43.13)

The present invention relates generally to fishing equipment. More particularly, the present invention relates to a fishing accessory which is used in conjunction with a fishing line. Specifically, the present invention relates to a fishing line accessory the construction of which permits it to be utilized as a casting weight, a sinker, a line connector and even a bobber.

Because of the variable depth at which fish may be found and the ever changing conditions of currents, tides and the like, it is necessary to be able to change not only the weight of the sinker, or sinkers, used but also their position on the line.

This is not possible with the "split shot" sinker which is crimped firmly in the desired location by pliers, teeth or other means readily at hand. Because of its application, once such a weight is applied to the line, it is difficult, if not impossible, to readily change its position or remove it without injuring the line. Any weight which attaches to the line by pinching or by bearing against a knot tied in the line is not readily positionable or changeable and can impart excessive strains on the line as well as weaken it by abrasive wear.

Moreover, in some situations and to some fisherman, it is desirable to have the weight mounted in such a way as to be slidable along the line in order to reduce the stress to the line when a large fish strikes.

Heretofore, those sinker devices which had been constructed in such a way as to be variably positionable along and readily removable from the line, have required intricate moving parts or spring clips to effect their purpose. Such devices are subject to breakage under use or deterioration from exposure. Moreover, they are often difficult to operate when the hands of the fisherman become cold and stiff.

Other attempts to obviate the difficulties attendant upon the clincher type sinkers have involved those which require wrapping a portion of the line around or through the device and then clamping it or permitting the frictional engagement of the line with the device to hold it in position. These prior known devices, however, lack the ability to be mounted slidably on the line when desired, are not readily placed at the end of the line to serve as a terminal sinker and require additional swivels, snaps and the like to connect leaders, hooks and/or plugs.

It is therefore an object of the present invention to provide a fishing line accessory which can function as a sinker and which is readily attachable to and detachable from the line as well as movably positionable therealong.

It is another object of the present invention to provide a fishing line accessory, as above, which may be selectively mounted to maintain a fixed position on the line or be slidable therealong.

It is another object of the present invention to provide a fishing line accessory, as above, which requires no moving parts, springs or attachments and which will not snag on subsurface obstructions, break under use or deteriorate upon exposure and which is readily attachable and detachable without requiring a high degree of manual dexterity.

It is still another object of the present invention to provide a fishing line accessory, as above, which can be mounted at any position along the line, and even at the end thereof, and which, while functioning as a sinker, can serve as a convenient coupling member for joining lines, joining a line to a leader, or even joining a snelled hook to a line without kinking the snell.

It is a further object of the present invention to provide a fishing line accessory, as above, which, though it will not snag, will tend to resist both rolling laterally on the bottom and rotating as it moves through the water so as to eliminate twisting of the line.

It is a still further object of the present invention to provide a fishing line accessory, as above, which may be made of a substance having a specific gravity greater than water to be used as a sinker and/or line connector but which, with equal facility, may be constructed of a substance having a specific gravity less than water to be used as a bobber and/or surface line connector.

It is an even further object of the present invention to provide a fishing line accessory, as above, which can be readily and inexpensively manufactured.

These and other objects of the invention, and further advantages thereof, will become apparent in the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Figure 1:
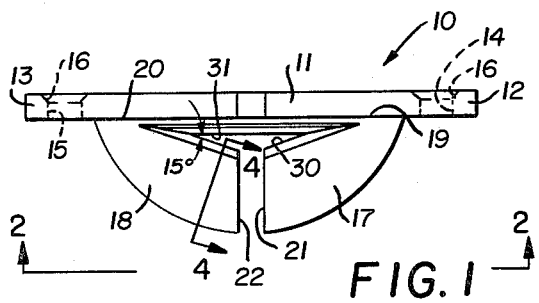
FIG. 1 is a side elevation of a fishing line attachment according to the concept of the present invention.
Figure 3:
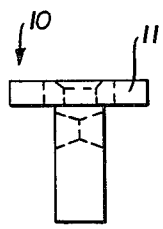
FIG. 3 is an end elevation.
Figure 2:
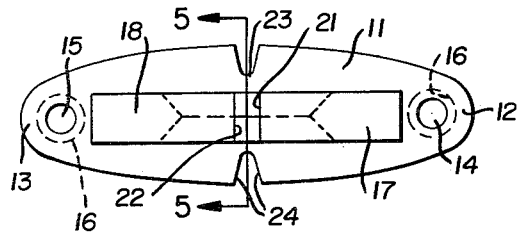
FIG. 2 is a plan view taken substantially on line 2—2 of FIG. 1.
Figure 4:
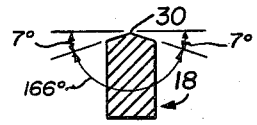
FIG. 4 is a cross section taken substantially on line 4—4 of FIG. 1.
Figure 5:
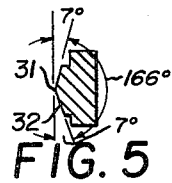
FIG. 5 is a cross section taken substantially on line 5—5 of FIG. 2.

In general, a fishing line accessory according to the concept of the present invention, comprises a substantially, flat, generally elliptic base, the opposed rounded ends of which are each provided with a bore transversely of the flat base. Mounted on one side of said flat base and extending outwardly therefrom, are preferably two opposed, spaced apart cleat arms directed toward each other and aligned with each other and with the transverse bores.

Referring more particularly to the drawings, the fishing line accessory is indicated generally by the numeral 10. The base 11 of accessory 10 is generally flat and is preferably elliptic with rounded ends 12 and 13. The base has a first and second bore 14 and 15, one located in proximity to each end 12 and 13, respectively, and both being preferably countersunk, as at 16, for reasons hereinafter more fully apparent.

A pair of cleat arms 17 and 18 are attached to and extend outwardly from one side of base 11. One end 19 of the first cleat arm 17 is attached to base 11 in proximity to the first bore 14, and one end 20 of the second cleat arm 18 is attached to base 11 in proximity to the second bore 15.

The second ends 21 and 22 of the respective cleat arms 17 and 18 facingly oppose each other in spaced apart relation and are generally perpendicular to the plane of the base.

A bifid notch 23 is also preferably provided on each side of the base 11 in alignment with the gap between the spaced apart ends 21 and 22 of the cleat arms 17 and 18. The bifid notches 23 are both oriented transversely to the flat base 11 and each extend toward the other approximately ¼ to ⅓ the width of the base with slightly flaring, or outwardly divergent, sides 24.

Figure 7:
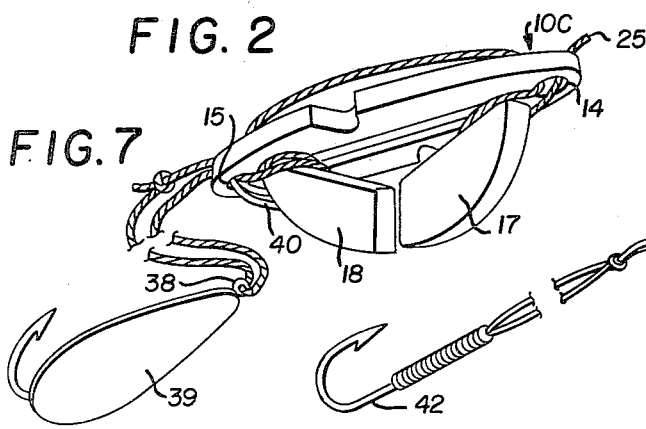
FIGS. 6, 7 and 8 are perspective views depicting the fishing line accessory mounted on the line in various ways.
Figure 8:
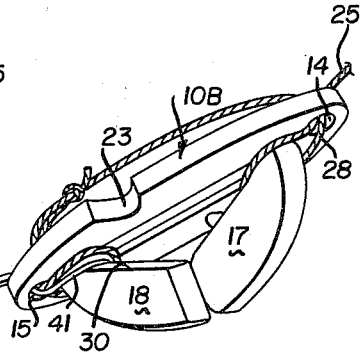
Figure 6:
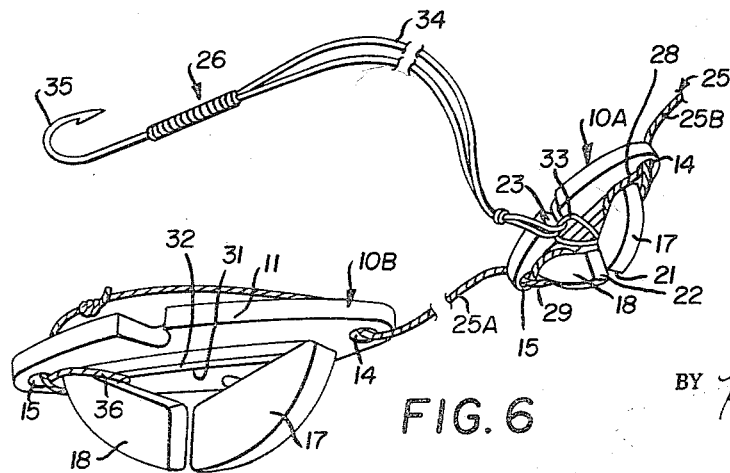

To best understand the diverse applications capable with such a fishing line accessory, several of the myriad arrangements possible are depicted in FIGS. 6–8. In FIG. 6 the fishing line 25 carries two accessories, 10A and 10B. The accessory 10A is utilized as an intermediary weight, i.e., upwardly from the lower end of the line 25—and accessory 10B is utilized as a terminal weight, i.e., at the end of the line. Additionally, the accessory 10A serves as a connector for the snelled hook 26.

The accessory 10A is connected to the line 25 by threading a first loop 28 of line 25 through the first bore 14 and passing the eye of the loop 28 over the first cleat arm 17. A second loop 29 is similarly threaded through bore 15 with its eye being passed over the second cleat arm 18. The accessory 10A is maintained in its relative position along line 25 by the frictional contact between the accessory and the line. The greater the stress on the line, the more firmly the accessory is held thereby.

It has been found that with monofilament lines, particularly, a clincher edge is preferably provided on each cleat arm. The clincher edge 30 comprises a shallow wedgelike bevel at least on that portion of the cleat arm facing the base. While the clincher edge may comprise the full portion of the cleat arm facing the base it is only necessary that it comprise that portion facing and adjacent to the base 11. It should be noted that the clincher edge 30 should not be so sharp as to sever or otherwise abrade the line 25 but yet be sufficiently pointed to serve as an adequate snub against which the line will frictionally engage. A bevel of approximately 7° on each side has been found to be most desirable.

It is for the protection of line damage also that each bore 14 and 15 is countersunk, as at 16.

Cooperatively associated with the clincher edges 30 on the cleat arms 17 and 18 is a snubbing ridge 31 extending along the base 11 between the connections of the cleat arms 17 and 18 thereto. The snubbing ridge is similarly provided with a shallow wedgelike bevel 32 oppositely disposed to and intersecting the clincher edge 30 in an acute angle of approximately 15°.

Referring again to FIG. 6, the accessory 10A can be selectively moved along the line 25 to desired positions without being removed. To do so one need only grasp that portion of the line extending along the flat base between the bores 14 and 15 on the opposite side of the base from the cleat arms 17 and 18 and pull the line in such a direction that the new location along the line at which it is desired to locate the accessory is pulled to the accessory. That is, if it is desired to move accessory 10A to point 25A on line 25, that portion of the line extending between the bores 14 and 15 is pulled so as to move the point 25A to the accessory, it being found that the loop around a single cleat arm will not lockingly bind the line. Then, the portion 25B of the line is pulled to remove the slack formed in the line between the bores 14 and 15.

The accessory 10A is also used as a connector. The loop 33 of the snell 34 attached to hook 35 is positioned between the spaced apart ends 21 and 22 of the cleat arms 17 and 18 and the hook 35 is passed through the loop and drawn so that the thus formed bight tightly encircles the accessory 10A with the snell reposing within the bifid notches 23.

The accessory 10B which serves as a terminal sinker is attached to the line by inserting the end of the line through the first bore 14 in the manner reversed to that of accessory 10A. The end of the line which has been tied in a loop 36 is threaded through bore 15 and received over cleat arm 18.

Such a terminal sinker is particularly immune from undesirable lateral rolling along the bottom. The triquetrous cross-sectional shape of the attachment gives it stability against rolling, yet the rounded sides of the base 11 and the generally arcuate profile of the cleat arms allow the accessory to slide along the bottom and across obstructions without snagging.

In FIG. 7 the accessory 10C is attached to the line 25 in a third manner. Here the line is looped around the accessory in the same manner as 10A and the end of the line is strung through the eyelet 38 in lure 39 and the end of the line which is tied in a loop 40 is inserted through bore 15 and anchored around cleat arm 18.

With prior known connectors such a connection demanded a swivel since it is possible that an undulating lure, if tangled, would spin as it was pulled through the water. However, with the accessory 10C having its triquetrous cross-section the aligned cleat arms simulate the keel of a boat and resist the spinning action of the lure, thus preventing deleterious twist in the line between the accessory and the pole.

The terminal arrangement of accessory 10B may also serve as a connector for a leader or the like rearwardly of the line. As shown in FIG. 8, the accessory 10B connected to the line 25 in a fashion identical to that by which accessory 10B is connected in FIG. 6 and receives the loop 41 of the snelled hook 42 through the bore 15 which may be anchored over cleat arm 18.

Obviously, the accessory may be made in different sizes and of different materials to vary the weight, even through a range sufficient to vary use of the accessory from a sinker to a bobber.

However, myriad other connecting arrangements will suggest themselves to the angler. Some fishermen will wish to have the accessory freely slidable along the line. This can be done merely by passing the line through the two bores without looping it around either cleat arm. Other fishermen may desire looping only over a single cleat arm, and still other fishermen will desire additional assurance of a fixity of position by looping over both cleat arms and additionally wrapping that portion of the line passing between the two bores several times transversely of the accessory in the bifid notches 23.

It should, however, be obvious from the above disclosure that a fishing line accessory made in accordance therewith can serve as a sinker, coupler and/or bobber and accomplish the objects of the invention.

What is claimed is:

1. A fishing line accessory comprising, a flat, generally elliptic base having opposed ends, there being a line guiding bore transversely of said base in proximity to at least one of said ends, at least one arcuately profiled cleat arm extending transversely outwardly from said base in proximity to said bore and directed away therefrom, said cleat arm intersecting said base on the side of said cleat arm opposite from said bore at approximately 15° for snubbing the line passing through said bore and said accessory having a cross section transversely of said base and through said cleat arm which is triquetrous.

2. A fishing line accessory comprising, a flat, generally elliptic base having opposed ends, there being a bore transversely through said flat base in proximity to each end thereof, first and second cleat arms, said cleat arms having arcuate profiles, one end of the first cleat arm attached to one side of said base in proximity to one of said bores, one end of said second cleat arm attached to the same side of said base and in proximity to the other of said bores, said cleat arms being aligned and the other ends of said cleat arms facing each other in opposed, spaced apart relation so that the cross section of said accessory transversely of said base and through said cleat arms is triquetrous.

3. A fishing line accessory comprising, a flat, generally elliptic base having opposed ends, there being a bore transversely through said flat base in proximity to each end thereof, first and second cleat arms, said cleat arms having arcuate profiles, one end of the first cleat arm attached to one side of said base in proximity to one of said bores, one end of said second cleat arm attached to the same side of said base in proximity to the other of said bores, said cleat arms being aligned with each other and said bores so that said accessory has a triquetrous cross section transversely of said flat base, the other ends of said cleat arms facing each other in opposed, spaced apart relation, opposed, medially located notches, one on each side of said base between said opposed ends, said notches aligned with said opposed spaced apart ends.

4. A fishing line accessory, as set forth in claim 3, having a beveled clincher edge on a portion of each said cleat arm facing said flat base, said beveled clincher being beveled at approximately 166° and intersecting said base at approximately 15°.

5. A fishing line accessory, as set forth in claim 4, having a snubbing ridge, said snubbing ridge extending along said base between the ends of said cleat arms attached to said base, that portion of said snubbing ridge facing said clincher edge being similarly beveled at approximately 166°.

6. A fishing line accessory comprising, a flat, generally elliptic base having opposed ends, there being a bore transversely through said flat base in proximity to at least one end, at least one cleat arm attached to one side of said base in proximity to said bore, said cleat arm extending transversely outwardly of said flat base to present an arcuate profile so that said accessory has a triquetrous cross section transversely of said base and through said cleat arm, a clinch edge on said cleat arm, said clinch edge facing said base and being beveled at approximately 166° and intersecting said clinch edge at approximately 15°.

7. A fishing line accessory, as set forth in claim 6, having a snubbing ridge on said base facingly opposing the clinch edge on said cleat arm, said snubbing ridge being beveled at approximately 166°.

References Cited by the Examiner
UNITED STATES PATENTS

| | | | |
|---|---|---|---|
| 685,263 | 10/01 | Decor | 43—43.1 |
| 774,429 | 11/04 | Hurlbut | 43—43.1 |
| 874,770 | 12/07 | Hurst et al. | 24—130 |
| 1,455,636 | 5/23 | McConnal | 24—130 |
| 1,731,408 | 10/29 | Finnessy | 248—304 X |
| 2,874,508 | 2/59 | Anderson | 43—43.1 |

FOREIGN PATENTS 507,523  11/54  Canada.

OTHER REFERENCES

Popular Science Magazine, March 1950, page 137.

SAMUEL KOREN, *Primary Examiner.*

ABRAHAM G. STONE, *Examiner.*